Aug. 14, 1956  A. G. F. WALLGREN  2,758,892
RADIAL THRUST BEARING
Filed June 9, 1952
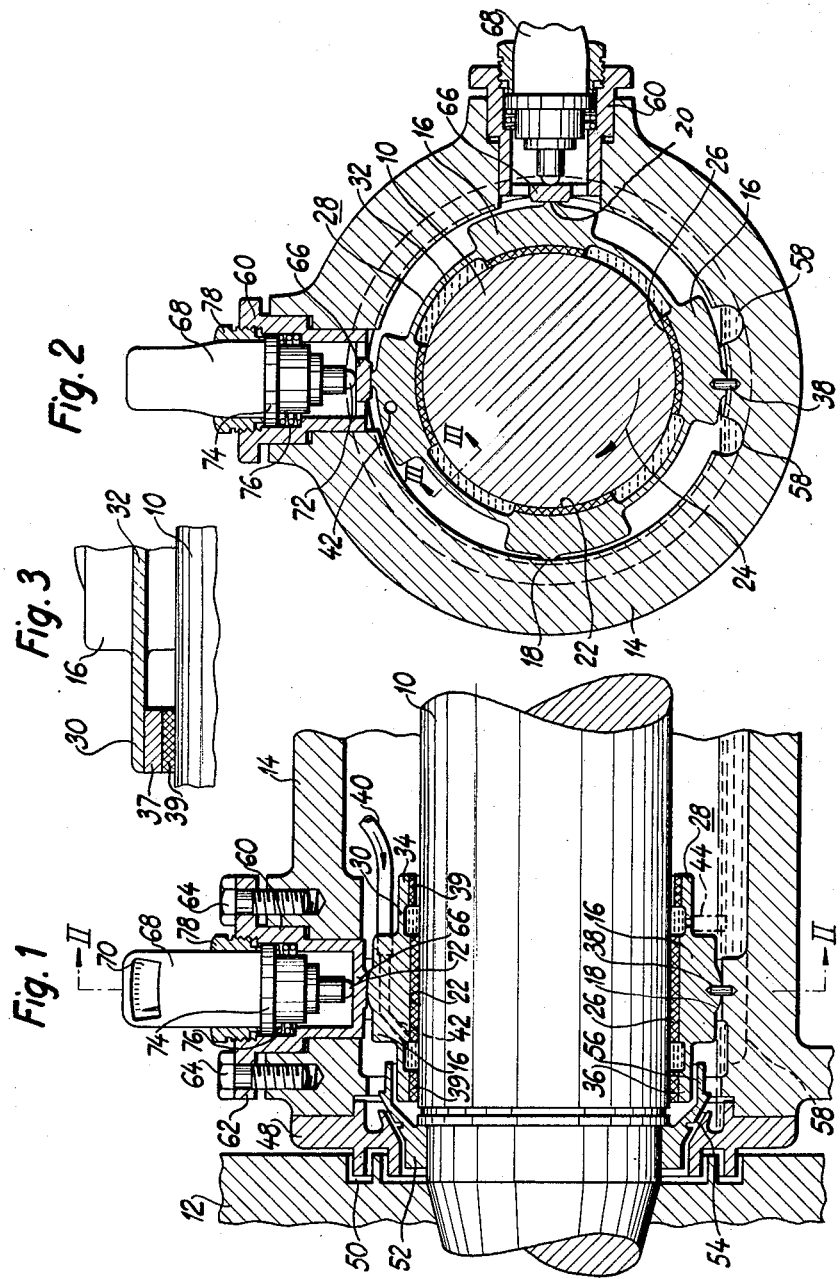

United States Patent Office 2,758,892
Patented Aug. 14, 1956

2,758,892

RADIAL THRUST BEARING

August Gunnar Ferdinand Wallgren, Goteborg, Sweden

Application June 9, 1952, Serial No. 292,509

Claims priority, application Sweden June 11, 1951

10 Claims. (Cl. 308—73)

My invention relates to radial thrust bearings of the kind provided with tiltable bearing blocks between which and a co-operating bearing surface of a journal member during rotation of the latter load-sustaining lubricant films are set up due to tilting of the blocks about supporting surfaces of the bearing to provide wedge-shaped spaces between the bearing surfaces and more particularly to such bearings wherein the blocks are non-rotatably mounted.

While my invention will be hereinafter described with reference to its application to the accurate mounting of spindles of machine tools, such as grinding spindles, it is to be understood that this application is given merely by way of example and that the invention is in no sense limited to such application.

When a grinding spindle is loaded an elastic deformation arises which is inversely proportional to the fourth power of the spindle diameter. In order to reduce the deformation the shaft is normally made exceptionally large with respect to the prevailing forces and moreover is rotated at a higher speed, thus reducing the loading due to the grinding disc and the pulley.

In this kind of mounting it is known to construct the radial thrust bearings with non-rotating bearing blocks more or less uniformly distributed, the blocks being under the action of an initial load. Such a construction is intended to maintain the axis of the grinding spindle in a constant position as far as possible under all prevailing loading and operating conditions.

It has also been proposed to enclose the bearing blocks within an angular space through which oil under pressure is caused to circulate in order to prevent access of air to the sliding surfaces and to ensure effective lubrication and cooling of the bearing.

This latter construction provides a difficult problem with regard to the sealing of the bearing and it is a matter of considerable importance to reduce leakage from the oil space without also creating high frictional losses which would entail high power consumption and detrimental heating of the bearing. Sealing devices which bear directly on the shaft, such as collar seals, cannot be used in cases as above-described where the shaft has a comparatively large diameter and also a relatively high rotational speed.

If a gap or clearance is formed between the rotating shaft and a stationary bearing element the leakage therethrough is proportional to the third power of the width of the clearance while under conditions otherwise the same the frictional losses in the oil change in a straight line form. Any gain consequent on reduction of the leakage will thus be considerably greater than any increase in the frictional losses on reducing the width of the clearance gap. In such cases, however, the construction is dependent on unavoidable tolerances in manufacture which determine the lower limit of the width of the clearance gap. It is also of importance that the clearance gap around the shaft is of constant width since in the case of a shaft disposed eccentrically relative to the surface of the clearance gap leakage will be increased to two and one half times that with a uniform clearance.

If the shaft journalled in a radial thrust block bearing is of cylindrical form the cylindrical load-sustaining surfaces of the block must always be co-axial with the sliding surface of the shaft to avoid edge pressures between said surfaces due to turning of the blocks. This in turn entails the oil film between the sliding surfaces being thin, for example of a magnitude of the order of a few thousandths of a millimetre. A thin oil film is also desirable in view of the requirement that the axis of the grinding spindle shall vary its position to a minimum degree when the spindle is initially rotated from a stationary condition to form the oil film between the sliding surfaces or with load variations.

One object of my invention is to provide a block bearing wherein the blocks assume correct positions on the sliding surface of the member co-operating therewith, such as a shaft, without increasing the width of the blocks to an unnecessarily high extent.

A further object of my invention is to provide a construction of radial thrust block bearing wherein the bearing blocks may operate entirely submerged in oil with the leakage and frictional losses of very small magnitude.

According to the main feature of my invention the blocks are connected with members holding the same in predetermined mutual positions and are movable relative to said members for performing their tilting movement, the said members constituting a sleeve element enclosing a lubricant and extending to the journalled member, the sleeve forming on at least one side of the blocks a clearance or gap relative to the journal member.

Such a construction facilitates the assembly of the bearing and fixes the blocks in their correct positions on the co-operating sliding surface, thus avoiding edge pressures. In the case of stationary bearing blocks the sleeve will form a packing gap with the rotatable shaft on one or both sides of the block.

Since the sliding surfaces of the blocks and the stationary sealing surface of the clearance gap form part of a unitary element and since the blocks on assembly assume predetermined positions relative to the shaft the sealing surface will assume a predetermined position. As a result it is possible to select a very small clearance, for example of the order of 0.01 mm. which will also be concentrically distributed around the circumference of the shaft. This kind of sleeve may be advantageously used in the case of bearing blocks submitted to an initial load as described above.

Further objects and advantages of the invention will be apparent from the following description considered in connection with the accompanying drawing, which forms a part of this specification, and of which:

Fig. 1 shows an axial longitudinal section through a radial block bearing constructed according to the invention and having non-rotating blocks supporting the grinding spindle of a grinding machine.

Fig. 2 is a cross section on the line II—II of Fig. 1.

Fig. 3 shows a section of one half of the block sleeve taken on the line III—III of Fig. 2 and on a larger scale, this figure showing a slight modification of the invention.

Referring to the drawing, 10 designates a spindle, on the end portion of which is rigidly mounted the hub 12 of a grinding disc. The spindle is carried by two radial thrust bearings, one of which is shown in the drawing, the said bearings being enclosed by a common bearing housing 14. Tiltably mounted in the stationary bearing housing 14 are a number of bearing blocks 16 uniformly distributed around the circumference. In the embodiment shown, only four bearing blocks have been illustrated for the sake of clarity, but the number may be varied, as for example, it may be greater. The blocks are formed in known manner with projections 18 forming supporting surfaces for the blocks during tilting thereof. The supporting surface of projection 18 is preferably located behind the middle point of the cylindrical bearing surfaces 22 of the blocks contacting the journal surface of the spindle 10, viewed in the direction of rotation indicated by the arrow 24 in Fig. 2, the journal surface of the spindle being also cylindrical.

On rotation of the spindle, the blocks are caused to tilt about the supporting surfaces 18, so that their forward edges will rise from the journal surface of the spindle to form a wedge-shaped space, in which a load-sustaining oil film is produced. This film should be thin, in order to reduce movement of the centre line of the spindle to a minimum, and it is then of particular importance that edge pressure of the blocks is avoided. The projections 18 are therefore shaped according to Fig. 1 and are, moreover, located centrally on the blocks so as to be loaded at the middle thereof. The bearing surface of the blocks may comprise linings 26 of bearing metal such as lead bronze.

The blocks are mutually connected and preferably made integral with a sleeve, generally denoted by 28. This sleeve comprises lateral portions 30 which are preferably cylindrical and integral around the circumference, said lateral portions being secured to the lateral edges of the block and extending axially outwardly from these edges while merging between the blocks into portions 32 bridging the space intermediate the fore and rear edges of adjacent blocks. These portions of the sleeve are so thin that they do not resist the tilting movements of the blocks in any appreciable extent.

The lateral portions 30 are connected to flange portions 34, 36, which project toward the shaft and therefore are of greater thickness in the radial direction than are the portions 30 and 32. The flange portions have an inner diameter greater than the diameter of the shaft, so as to form an intermediate clearance. This clearance may be smaller at the outwardly located flange portion 36 than at the flange portion 34 more closely adjacent to the other radial thrust bearing in the bearing housing 14. While the first-mentioned clearance may have a magnitude of 0.01 to 0.02 mm. so as to serve as a packing gap, the latter clearance may be of a magnitude of 0.15 mm. so as to form a clearance choke. In order that the intermediate portions 32 shall permit of being formed by a slotting operation in the manufacture of the sleeve 28, one or both flange portions may comprise a separate ring 37 according to Fig. 3, which is connected in some way or other with the sleeve portion 30. The ring 37 then has an outer diameter, which is equal to or somewhat greater than the inner diameter of the intermediate portions 32.

The sleeve is retained in its proper positions peripherally by means of a guide pin 38 or the like, which may be arranged in the supporting cam 18 on one of the blocks 16. The flange portions 34 and 36 and the ring 37 respectively may have an inner lining 39 of bearing metal, similar to that of the blocks 16.

As will be clear from the above, the bearing surfaces 22 of the blocks are enclosed within the sleeve 28, which communicates through two clearance gaps with the ambient atmosphere. Oil is supplied to the interior of the sleeve through a conduit 40 from a pump, not shown, said conduit being preferably connected to one of the blocks 16 having a transversely extending passage 42, through which the oil is led into the sleeve space adjacent to the outer flange portion 36 at a pressure of, for example, 3 metres oil column. The interior of the sleeve will thus always be entirely filled with oil, which is continuously caused to circulate through the interior of the sleeve. As the right hand clearance, Fig. 1, is formed as a clearance choke, the clearance may at the same time constitute an outlet from the interior of the sleeve.

In the case where this clearance is also a gap packing as mentioned above, the sleeve may be provided with an outlet aperture, which then preferably communicates with a pipe 44, as indicated by chain-dotted lines in Fig. 1. The pipe 44 opens below the oil level of the lower portion of the bearing housing, which serves as a well thus counteracting the formation of foam in the outflowing oil. The oil is preferably very thin and may be constituted by kerosene with a small admixture of spindle oil, which feature places further demands on the sealing. The oil passes from the well to a supply container for cooling, ventilation and purification.

Some of the blocks, in the present case the uppermost block and the block 16 located on the extreme right according to Fig. 2, are subjected to pressure from spring members, so that the blocks will be under load even when the spindle is stationary and the machine is consequently not in use. Inserted into a radial bore in the bearing housing 14 is a cup-like socket 60 provided with lugs 62 for bolts 64 threaded into the bearing housing. The radial position of the socket is adjustable by means of these bolts. The socket has a resilient base in the form of a bar 66, on which the block 16 is supported in a tiltable manner by its projection 18. The base 66 may be formed as a transverse bar fixed at its ends by milling off side portions of the base, as will be seen from Fig. 2. This bar thus forms a stiff spring made integral with the socket. Inserted into the socket is a measuring device 68 of precision type, preferably one in which every graduation on the scale 70 thereof corresponds to a displacement of five ten-thousandths or one thousandth of a millimetre of the measuring point 72 of the measuring device, said point bearing on the upper face of the bar 66. The measuring device 68 is preferably formed in known manner with members for damping the movements of the pointer thereof. The measuring device has a central flange 74, a spring 76 being inserted between said flange and an abutment in the socket 60. The measuring point 72 may be adjusted for a desired initial position by means of an adjusting screw 78.

After the measuring device has been adjusted so that its pointer takes the 0-position, when the measuring point 72 bears on the unloaded bar 66, the measuring device is calibrated by subjecting the bar to a known load. In this manner the force by which the socket 60 is pressed against the block 16 may be controlled with very great accuracy. It will be understood that it is unimportant if the blocks are of different thicknesses, and thus the demands for exactitude in the manufacture of these blocks need not be particularly high. It is of importance that the spring member is stiff, so that the middle position of the spindle will not be influenced in any noticeable degree should the load on the spindle alter its direction. The stiffness of the spring member may be such that its deflection shall not be greater than can be read off within the scale on precision measuring devices of the above described type and of forms available on the market.

On the other hand, the spring member must allow for deflection, such that the spring force only increases to a comparatively small degree upon the application of the initial bearing load, for instance by 10 to 25%, when the spindle is caused to rotate and the wedge-shaped oil films are formed between the spindle and the blocks.

The play between the blocks and the spindle is zero due to the initial load when the spindle is stationary. When the spindle 10 rotates and the blocks adjust themselves with a wedge-shaped clearance relative to the sliding surface of the spindle, this clearance will at the leading edge be of the magnitude 0.01 mm., and is thus considerably smaller towards the rear edge of the supporting surface, where it is therefore also smaller than the width of the clearance at the flange portion 36. The initial load also assists in ensuring a uniform clearance width between the sleeve 28 and the spindle 10 around the circumference under all loading and operating conditions. On tilting of the blocks the lateral and intermediate portions 30, 32 of the sleeve are subjected to a certain deformation, which in itself is immaterial and is transferred only to a small degree to the flange portions 34, 36. These portions may thus assume a non-circular shape about the shaft with a deviation from the cylindrical shape, which at the most is only a small fraction of the clearance width between the flange portions and the spindle.

The bearing housing may be provided with an end plate 48 formed with a labyrinth packing 50 against the hub 12 of the grinding disc. Inside the end plate 48, a rejecting ring 52 is arranged on the shaft, said rejecting ring forming with the end plate a narrow conical gap 54, the greatest diameter of which is directed inwardly toward the bearing. The rejecting ring may have an inner cylindrical flange portion 56 extending inwardly over the outer flange portion 36 of the sleeve 28. The conical gap 54 of known form is intended to hurl back such oil that might tend to penetrate out of the bearing housing through the gap. The lower portion of the bearing housing 14, which serves as an oil well, may be formed with channels 58 on both sides of the lowermost bearing block 16, so that the oil may adjust itself to the same level on both sides of the bearing.

Steps may be taken in known manner to ensure that the sleeve 28 is filled with oil, before the spindle 10 is caused to rotate. If the mounted shaft has its end portion next to the bearing, the sleeve may have a lateral wall displaced toward the centre on the one side, said wall then screening off the shaft from the surroundings. In such case the sleeve only has a gap packing against the shaft.

While several more or less specific embodiments of the invention have been shown, it is to be understood that this is for purpose of illustration only, and the invention is not to be limited thereby, but its scope is to be determined by the appended claims viewed in the light of the prior art.

What I claim is:

1. A radial bearing comprising, in combination with a member having a journal surface, a supporting structure around said member and radially spaced therefrom, a plurality of peripherally spaced bearing blocks between said member and said supporting structure for transmitting radial load between the parts and a sleeve member located in the space between said member and said supporting structure, said sleeve member being fixedly connected with said blocks to hold the same in fixed peripherally spaced relation and providing a peripherally continuous wall for the retention of a body of liquid lubricant around the journal surface, said sleeve member providing, on at least one side of said blocks, an annular clearance space between itself and the journal surface.

2. A bearing as defined in claim 1 in which the blocks are supported by the supporting structure to tilt upon relative rotation between the blocks and the journal, and in which said sleeve member is constructed to permit such tilting.

3. A bearing as defined in claim 2 in which the sleeve member comprises a relatively thin and flexible portion connecting said blocks and distortable to permit the tilting of the blocks.

4. A bearing as defined in claim 1 in which the sleeve member extends axially from both sides of said blocks and comprises axial end portions of greater radial thickness than the axially intermediate portion.

5. A bearing as defined in claim 4 in which said end portions extend radially inwardly to provide sealing surfaces with small clearances between the same and the journal.

6. A bearing as defined in claim 1 including a supply conduit for lubricant communicating with the space within the sleeve member.

7. A bearing as defined in claim 6 in which the outlet end portion of said conduit comprises a passage in one of said blocks.

8. A bearing as defined in claim 6 in which said sleeve member is apertured to permit discharge of lubricant from the space within the sleeve member, said supporting structure providing a well for the reception of lubricant discharged from said space.

9. A bearing as defined in claim 1 in which said supporting structure includes means for exerting preloading radial stress on certain of said blocks.

10. A radial bearing comprising, in combination with a member having a journal surface, a supporting structure around said member and radially spaced therefrom, a plurality of peripherally spaced bearing blocks between said member and said supporting structure for transmitting radial load between the parts and a sleeve member located in the space between said member and said supporting structure, said sleeve member being fixedly connected with said blocks to hold the same in fixed peripherally spaced relation, said supporting structure including means for exerting a pre-loading radial stress on certain of said blocks.

References Cited in the file of this patent
UNITED STATES PATENTS

| | | |
|---|---|---|
| 1,322,332 | Newbigin | Nov. 18, 1919 |
| 1,593,251 | Flintermann | July 20, 1926 |
| 1,870,857 | Mathewson | Aug. 9, 1932 |
| 2,224,652 | Kingsbury | Dec. 10, 1940 |